(12) United States Patent
Mueller et al.

(10) Patent No.: US 10,988,075 B2
(45) Date of Patent: Apr. 27, 2021

(54) HEADLAMP AND METHOD FOR OPERATING SAME COMPRISING A POSITION AND ACCELERATION SENSOR AND A CONTROL UNIT ARRANGED IN OR DIRECTLY ON THE HEADLAMP

(71) Applicant: DAIMLER AG, Stuttgart (DE)

(72) Inventors: Axel Mueller, Schorndorf (DE); Marc Necker, Weil der Stadt (DE); Stephan Finn, Böblingen (DE); Katharina Wagner, Böblingen (DE); Stefan Töpfer, Gärtringen (DE); Joerg Moisel, Neu-Ulm (DE); Björn Böke, Sindelfingen (DE); Marcus Fiege, Stuttgart (DE); Ismail Kilic, Stuttgart (DE); Carsten Lorenz, Grafenau (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/616,649

(22) PCT Filed: May 24, 2018

(86) PCT No.: PCT/EP2018/063688
§ 371 (c)(1),
(2) Date: Nov. 25, 2019

(87) PCT Pub. No.: WO2018/215609
PCT Pub. Date: Nov. 29, 2018

(65) Prior Publication Data
US 2020/0198525 A1    Jun. 25, 2020

(30) Foreign Application Priority Data
May 26, 2017   (DE) ...................... 10 2017 005 019.8

(51) Int. Cl.
*B60Q 1/11*    (2006.01)
*H05B 45/10*   (2020.01)
(Continued)

(52) U.S. Cl.
CPC .............. *B60Q 1/11* (2013.01); *F21S 41/141* (2018.01); *F21S 41/635* (2018.01);
(Continued)

(58) Field of Classification Search
CPC ................ B60Q 1/11; B60Q 2300/114; B60Q 2300/132; B60Q 2300/32; B60Q 1/10;
(Continued)

(56) References Cited

U.S. PATENT DOCUMENTS 7,241,034 B2 * 7/2007 Smith ...................... B60Q 1/10
                                                        362/465
8,905,604 B2 * 12/2014 Kasaba .................... B60Q 1/10
                                                        315/77
(Continued)

FOREIGN PATENT DOCUMENTS

DE   102005043058 A1   3/2007
DE   102011109434 A1   6/2012
(Continued)

OTHER PUBLICATIONS

Examination Report dated Apr. 3, 2018 in related/corresponding DE Application No. 10 2017 005 019.8.
(Continued)

*Primary Examiner* — Borna Alaeddini
(74) *Attorney, Agent, or Firm* — Patent Portfolio Builders PLLC

(57) ABSTRACT

A vehicle lighting device includes at least one headlight, a position and/or acceleration sensor, and a control unit for adjusting a light/dark boundary of the headlight. Pitch movements of the vehicle can be detected by the position
(Continued)

and/or acceleration sensor, and a change in the light/dark boundary due to the respective pitch movement can be compensated for by the control unit. The position and/or acceleration sensor and the control unit are arranged in the headlight or directly on the headlight.

6 Claims, 2 Drawing Sheets

(51) Int. Cl.
*F21S 41/675* (2018.01)
*F21S 41/63* (2018.01)
*F21S 41/141* (2018.01)
*F21W 102/165* (2018.01)

(52) U.S. Cl.
CPC ............ *F21S 41/675* (2018.01); *H05B 45/10* (2020.01); *B60Q 2300/114* (2013.01); *B60Q 2300/132* (2013.01); *F21W 2102/165* (2018.01)

(58) Field of Classification Search
CPC .... B60Q 1/0023; F21S 41/675; F21S 41/635; F21S 41/141; H05B 45/10; F21W 2102/165
See application file for complete search history.

(56) References Cited

U.S. PATENT DOCUMENTS

| | | | |
|---|---|---|---|
| 9,505,340 B2 | 11/2016 | Foltin | |
| 10,377,373 B2* | 8/2019 | Stettner | B60W 30/08 |
| 2004/0125608 A1* | 7/2004 | Izawa | B60Q 1/10 362/464 |
| 2012/0002430 A1* | 1/2012 | Yamazaki | B60Q 1/10 362/464 |
| 2012/0101692 A1* | 4/2012 | Kasaba | B60Q 1/10 701/49 |
| 2012/0106179 A1* | 5/2012 | Kasaba | B60Q 1/115 362/465 |
| 2014/0301094 A1* | 10/2014 | Ehlgen | B60Q 1/115 362/466 |
| 2015/0073654 A1 | 3/2015 | Foltin | |
| 2015/0239391 A1* | 8/2015 | Foltin | G01B 11/303 701/49 |
| 2017/0088036 A1* | 3/2017 | Roeckl | F21S 41/635 |
| 2017/0225610 A1* | 8/2017 | Lang | B60Q 1/115 |
| 2018/0065539 A1* | 3/2018 | Ohsawa | B60Q 1/085 |

FOREIGN PATENT DOCUMENTS

| | | |
|---|---|---|
| DE | 102011081354 A1 | 2/2013 |
| DE | 102012216088 A1 | 3/2014 |
| DE | 102013201850 A1 | 8/2014 |
| DE | 102014225344 A1 | 6/2016 |
| DE | 102015210927 A1 | 12/2016 |
| EP | 3023299 A2 | 5/2016 |
| JP | 2002337600 A | 11/2002 |
| WO | 2016091553 A1 | 6/2016 |

OTHER PUBLICATIONS

International Search Report dated Sep. 27, 2018 in related/corresponding International Application No. PCT/EP2018/063688.
Written Opinion dated Sep. 27, 2018 in related/corresponding International Application No. PCT/EP2018/063688.

* cited by examiner

HEADLAMP AND METHOD FOR OPERATING SAME COMPRISING A POSITION AND ACCELERATION SENSOR AND A CONTROL UNIT ARRANGED IN OR DIRECTLY ON THE HEADLAMP

BACKGROUND AND SUMMARY OF THE INVENTION

Exemplary embodiments of the invention relate to an illumination device for a vehicle and a method for the operation thereof.

DE 10 2011 109 434 A1 discloses a method for keeping a light emission direction of a lighting module of a vehicle constant in the event of movement of the vehicle body that causes a movement of the lighting module. In the process, the movement of the vehicle body is compensated. The compensation of the movement of the lighting module is achieved by means of controlling light sources that are arranged in the lighting module, a position of the lighting module being recorded as an actual value and compared with a target value of a beam direction of the lighting module, and a corrective signal for the control being determined. Furthermore, an illumination device for a vehicle for performing a method of this kind is described. The illumination device comprises a lighting module in which light sources are arranged, and a control unit for controlling the light sources. The illumination device further comprises a sensor for recording the actual value of the position of the lighting module, the control unit being designed to determine the corrective signal for controlling the light sources on the basis of the recorded actual value.

Furthermore, DE 10 2014 225 344 A1 discloses a motor vehicle comprising a headlamp having a first position sensor for outputting first position information, having a second position sensor for outputting second position information, and having an adjustment system. The adjustment system is designed for adjusting a light distribution, generated by the headlamp, on the basis of first and second position information.

Exemplary embodiments of the invention are directed to an illumination device for a vehicle that is improved compared with the prior art, and a method for the operation thereof that is improved compared with the prior art.

An illumination device for a vehicle comprises at least one headlamp, a position and/or acceleration sensor, and a control unit coupled to the position and/or acceleration sensor and is intended for adjusting a cut-off line of the headlamp, it being possible for pitching movements of the vehicle to be recorded using the position and/or acceleration sensor, and for a change in the cut-off line, brought about by the relevant pitching movement, to be compensated using the control unit.

According to the invention, the position and/or acceleration sensor and the control unit are arranged in the headlamp, in particular integrated in the headlamp, or are arranged directly on the headlamp, in particular fastened to the headlamp.

In a method according to the invention for operating the illumination device, pitching movements of the vehicle are recorded using the position and/or acceleration sensor, and a change in the cut-off line, brought about by the relevant pitching movement, is compensated using the control unit, i.e., the cut-off line is in particular adjusted to an orientation of the vehicle that has changed due to the relevant pitching movement.

The cut-off line of the headlamp is stabilized against pitching movements of the vehicle by means of the illumination device and in particular by means of the method for the operation thereof. Pitching movements are understood in particular to be pivot movements of the vehicle about the vehicle transverse axis thereof. In this case, the pitching movements are recorded using the position and/or acceleration sensor, and are compensated using the control unit, which adjusts the cut-off line. Arranging the position and/or acceleration sensor, as well as the control unit, in the headlamp, i.e., in particular the integration thereof in the headlamp, or arranging the position and/or acceleration sensor, as well as the control unit, directly on the headlamp, for example so as to be fastened to the outside of the headlamp, results in particularly short signal paths between the position and/or acceleration sensor and thus minimizes transmission times for sensor information from the position and/or acceleration sensor to the control unit, such that no or at least only very short latencies arise. As a result, very quick reaction to the pitching movements of the vehicle, and resulting very quick adjustment of the cut-off line, is made possible.

As a result of the illumination device according to the invention, and in particular also as a result of the method for the operation thereof, in particular the dazzling of other road users is prevented or at least significantly reduced, in particular the dazzling that may arise due to pitching movements of the vehicle due to ground unevenness. Furthermore, this ensures a maximum permissible range of the illumination by the headlamp, since it is not necessary to preventatively adjust the cut-off line so as to be too low.

The control unit and the position and/or acceleration sensor are advantageously formed as a common structural unit, i.e., they form an integrated structural unit. Particularly advantageously, the position and/or acceleration sensor is arranged in the control unit, in particular integrated in the control unit. This allows for simple handling of the common structural unit during assembly of the illumination device, and for example also in the case of necessary repair.

The position and/or acceleration sensor is in particular designed as a gyro sensor. The position and/or acceleration sensor, in particular when designed as a gyro sensor, can in particular record movements and/or accelerations in parallel with the vehicle height axis, vehicle transverse axis and/or vehicle longitudinal axis, and/or pivot movements and/or pivoting accelerations, and/or rotational movements and/or rotational accelerations, about one or more of the mentioned vehicle axes, and/or a pitch angle, roll angle and/or yaw angle. In order to record pitching movements of the vehicle, the position and/or acceleration sensor in particular records accelerations in parallel with the vehicle height axis and/or pivoting and/or rotational accelerations about the vehicle transverse axis and/or pivoting and/or rotational accelerations about the vehicle transverse axis.

Alternatively, or additionally, the position and/or acceleration sensor records a position of the vehicle, in particular with respect to the vehicle height axis, vehicle transverse axis, and/or vehicle longitudinal axis. For example, the position determination is made possible by determining one or more accelerations during a pitching procedure.

The position and/or acceleration sensor, in particular when designed as a gyro sensor, is for example designed as a micromechanical sensor that determines accelerations on a capacitive basis or is, for example, designed as a piezoelectric or piezoresistive sensor.

A position and acceleration sensor, i.e., a combined position and acceleration sensor by means of which both the position and accelerations of the vehicle can be recorded, is particularly advantageous. In particular, changes in the adjustment of the cut-off line due to an adjustment of the headlamp, for example over a longer usage time of the vehicle, and/or due to external influences, can be determined by means of a combined position and acceleration sensor of this kind. In the case of illumination devices according to the prior art, it is necessary to correct the adjustment during time in a workshop. Arranging the position and acceleration sensor in the headlamp or directly on the headlamp makes it possible, using the position and acceleration sensor, to determine and compensate for position tolerances that arise, with respect to a specified setting, in particular with respect to an ex-factory delivery state, in which factory the vehicle was manufactured, in particular by means of headlamp beam height control and/or modifying a projection of the headlamp, expediently by means of the control unit and corresponding actuation. In order to achieve this, the position and acceleration sensor, in particular the position sensor component thereof, exhibits a very high degree of accuracy of for example much less than 0.1° (<<0.1°).

In an advantageous embodiment, the control unit can be or is coupled to at least one surroundings recording means of the vehicle which records surroundings in front of the vehicle, and/or coupled to an active chassis system of the vehicle.

In the method for operating this embodiment of the illumination device, the control unit thus additionally evaluates information from the at least one surroundings recording means of the vehicle, which records the surroundings in front of the vehicle, and/or information from the active chassis system of the vehicle, and determines and/or predicts pitching movements of the vehicle therefrom. That is to say that, in particular, information of one or more forward-looking systems of the vehicle is used. As a result, in particular pitching movements of the vehicle can already be predicted before they occur. The surroundings recording means may, for example, comprise at least one stereo camera device, at least one lidar device, at least one radar device, and/or at least one ultrasound device. In particular, the active chassis system of the vehicle may also be coupled to the surroundings recording means or comprise the means. For example, the position and/or acceleration sensor, and/or the control unit, may also be a component of the active chassis system, in particular may be integrated therein. Therefore, the position and/or acceleration sensor, and/or the control unit, can be used both for adjusting the cut-off line of the headlamp and for the active chassis system, as a result of which additional components are saved on.

The information of the at least one surroundings recording means of the vehicle, which records the surroundings in front of the vehicle, and/or the information of the active chassis system of the vehicle, can, in particular, be used in a predictive manner, in order to eliminate latencies from the adjustment of the cut-off line and to thus move the stabilization of the cut-off line temporally even closer to the quick reaction speed of the position and/or acceleration sensor that is designed in particular as a gyro sensor. That is to say that, in particular, the adjustment of the cut-off line or at least the actuation of the adjustment can, for example, already begin before a relevant pitching movement is recorded by the position and/or acceleration sensor, since the pitching movement has already been predicted on the basis of the information of the at least one surroundings recording means of the vehicle, which records the surroundings in front of the vehicle, and/or on the basis of the information of the active chassis system of the vehicle. For example, the already initiated adjustment of the cut-off line is then defined more precisely based on the pitching movement recorded by the position and/or acceleration sensor.

In order to adjust the cut-off line, an adjustment device for mechanical adjustment of the headlamp and/or of a lens and/or of a reflector and/or of at least one light source of the headlamp can advantageously be actuated, and/or, in a particularly advantageous manner, a plurality of light sources of the headlamp can be actuated, by means of the control unit.

In particular in the case of the particularly advantageous adjustment of the cut-off line by actuating the plurality of light sources of the headlamp by means of the control unit, the headlamp advantageously comprises a plurality of light sources that are designed as light-emitting diodes (LED) and that are, in particular, arranged in a two-dimensional grid, also referred to as an LED field or LED array. In particular, the headlamp is designed as what is known as a pixel headlamp, in particular as a high-resolution pixel headlamp, advantageously each pixel constituting a light source and being actuable, and thus able to be activated or deactivated, by means of the control unit.

Further possibilities for headlamps comprising high-resolution pixel light sources include equipping headlamps with pixelated light-emitting diodes (key word: μAPS=BMBP project having an LED chip comprising 1014 individually actuable light pixels), laser scanners, micromirror arrays (key word: DLP=Digital Light Processing), or backlit LCDs.

Therefore, in the method for operating the illumination device, in order to adjust the cut-off line, the control unit actuates the adjustment device for mechanical adjustment of the headlamp, and/or of the lens, and/or of the reflector, and/or of at least one light source of the headlamp, and/or, in a particularly advantageous manner, actuates a plurality of light sources of the headlamp, the actuation of the light sources occurring in such a way that the cut-off line is adjusted by activating one or more of the light sources and deactivating one or more others of the light sources.

Arranging the position and/or acceleration sensor, and the control unit, in the headlamp or directly on the headlamp, in the manner described above, also results in particularly short signal paths between the control unit and the adjustment device or between the control unit and the light sources, and thus minimizes transmission times for information from the control unit to the adjustment device or the light sources, such that no or at least only very short latencies arise. As a result, very quick reaction to the pitching movements of the vehicle, and resulting very quick adjustment of the cut-off line, is made possible. Adjustment of the cut-off line by actuating the light sources, in order to activate or deactivate the relevant light source, in particular when the headlamp is designed as a pixel headlamp, in particular as a high-resolution pixel headlamp, is particularly advantageous, since this can be achieved at very short latencies and it is possible to achieve a high degree of precision in the adjustment of the cut-off line, since no mechanical movements are required. In this case, the cut-off line can be adjusted for example in that a projection, comprising the cut-off line, is displaced upwards or downwards by a few light sources, in particular pixels, in that the corresponding light sources are activated or deactivated. This allows for virtually instantaneous correction of the position of the cut-off line.

However, the short latencies achieved by the above-described arrangement of the position and/or acceleration sensor, and the control unit, in the headlamp or directly on the headlamp are also particularly advantageous in the case of the mechanical adjustment of the cut-off line by actuating the mechanical adjustment device, as this also allows for compensation, by means of a mechanical adjustment device of this kind, of the changes in the cut-off line caused by pitching movements.

Particularly in the case of the adjustment of the cut-off line by means of the mechanical adjustment device, but also in the case of the above-described adjustment of the cut-off line by actuating the light sources, the advantageously performed additional processing of the information of the at least one surroundings recording means of the vehicle, which records the surroundings in front of the vehicle, and/or the information of the active chassis system of the vehicle, also proves particularly advantageous for thereby additionally reducing the latencies.

The illumination device, and in particular also the method for the operation thereof, thus makes it possible, for example when the position and/or acceleration sensor detects a deceleration of the vehicle, for the cut-off line to be adapted accordingly, for example by means of the control unit actuating the adjustment device accordingly, or by means of the control unit actuating the light sources such that the projection is displaced upwards by a corresponding number of light source lines, in particular pixels, in order to compensate the pitching movement of the vehicle and to thus stabilize the cut-off line. The inverse adjustment takes place correspondingly in the case of identified acceleration of the vehicle. A similar procedure is also possible in the case of ground unevenness and resultant pitching movements of the vehicle. In this case, too, the position and/or acceleration sensor can identify plunging or tilting of the vehicle, i.e., a corresponding pitching movement, and the control unit can determine a correction of the cut-off line, in particular of the projection comprising the cut-off line, that is accordingly required, and can actuate the adjustment device or the light sources accordingly.

Advantageously, the illumination device, and in particular also the method for the operation thereof, makes it possible to omit level sensors on chassis axles of the vehicle, which sensors are used in the prior art for automatic headlamp beam height control, in particular on the basis of a load of the vehicle.

By means of the illumination device, and in particular also by means of the method for the operation thereof, it is possible in particular to compensate for changes of the cut-off line due to high-frequency pitching movements, which changes occur, for example, on account of driving over corrugations, speed bumps, curbs and similar ground unevenness. In particular, for this purpose, accelerations with respect to rotations about the vehicle transverse axis and laterally in parallel with the vehicle height axis are recorded by means of the position and/or acceleration sensor.

The adjustment of the cut-off line by means of the control unit is advantageously performed only by means of open-loop control, and not by means of feedback control. For this purpose, for example, a relevant position and/or acceleration is recorded by means of the position and/or acceleration sensor and is passed to the control unit. The control unit then determines, based on the transmitted sensor information and/or on the basis of the information of the at least one surroundings recording means of the vehicle, which records the surroundings in front of the vehicle, and/or the information of the active chassis system of the vehicle, one or more corresponding parameters, in particular correction parameters, and/or items of calibration data, for example from a table or characteristic curve, for example from what is known as a lookup table, and actuates the adjustment device or the light sources accordingly. The table or characteristic curve contains specified parameters, in particular correction parameters, and/or items of calibration data, which the control unit selects according to the position and/or acceleration determined in each case by the position and/or acceleration sensor, and actuates the adjustment device or the light sources accordingly. This allows for an adjustment of the cut-off line that can be implemented in a particularly quick, efficient, flexible and simple manner, and which requires, in particular, only minimal computational effort. Complex feedback control, involving a correspondingly high level of computational effort and time investment, which would lead to a delay in the adjustment of the cut-off line, is thus avoided. The parameters, in particular correction parameters, and/or calibration data, are in particular stored directly in the control unit, such that access times for accessing a further unit are omitted.

BRIEF DESCRIPTION OF THE DRAWING FIGURES

Embodiments of the invention will be explained in greater detail in the following, with reference to drawings, in which.

Figure 4:
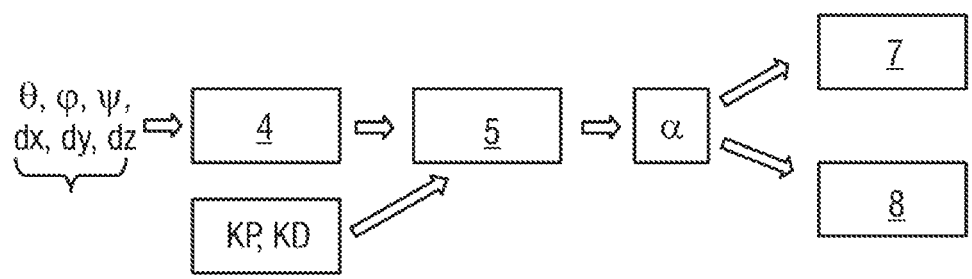

FIG. 4 schematically shows the course of a method for operating an illumination device for a vehicle.

Mutually corresponding parts are provided with the same reference signs in all the figures.

DETAILED DESCRIPTION

Figure 1:
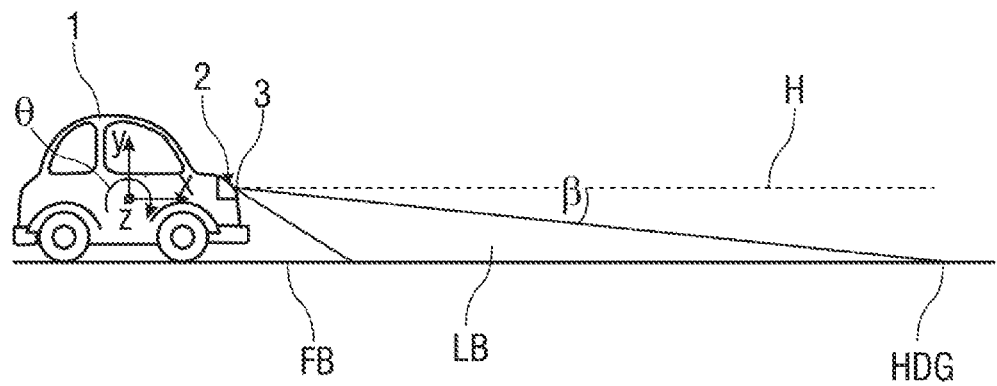
FIG. 1 is a schematic side view of a vehicle that is located on a roadway.

FIG. 1 is a side view of a vehicle 1 that is located on a roadway FB. The vehicle 1 comprises at least one illumination device 2, in order, in particular, to illuminate surroundings in front of the vehicle 1. In particular, in the case of a two-track vehicle 1, two illumination devices 2 of this kind are expediently provided, which illumination devices are each assigned to one side of the vehicle, respectively.

Figure 2:
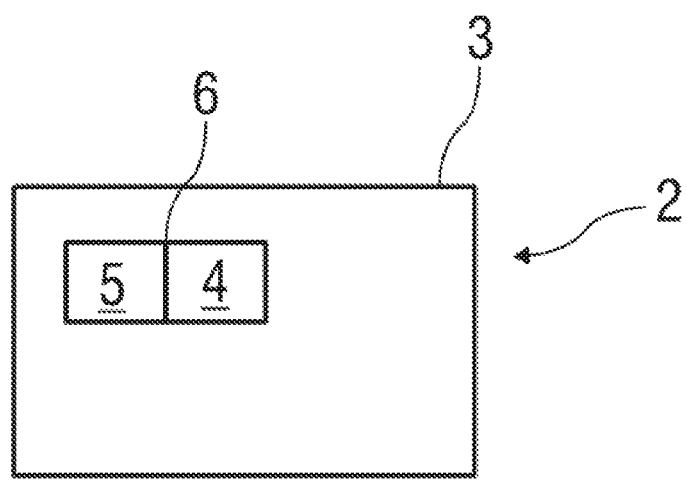
FIG. 2 is a schematic view of a illumination device for a vehicle.

FIG. 2 schematically shows an embodiment of an illumination device 2 of this kind. The illumination device 2 comprises at least one headlamp 3 having an adjustable cut-off line HDG. As an alternative to the form set out above, according to which in particular a two-track vehicle 1 advantageously comprises two illumination devices 2, it may also be possible for the two-track vehicle 1 to comprise just one illumination device 2 which comprises two headlamps 3.

Figure 3:
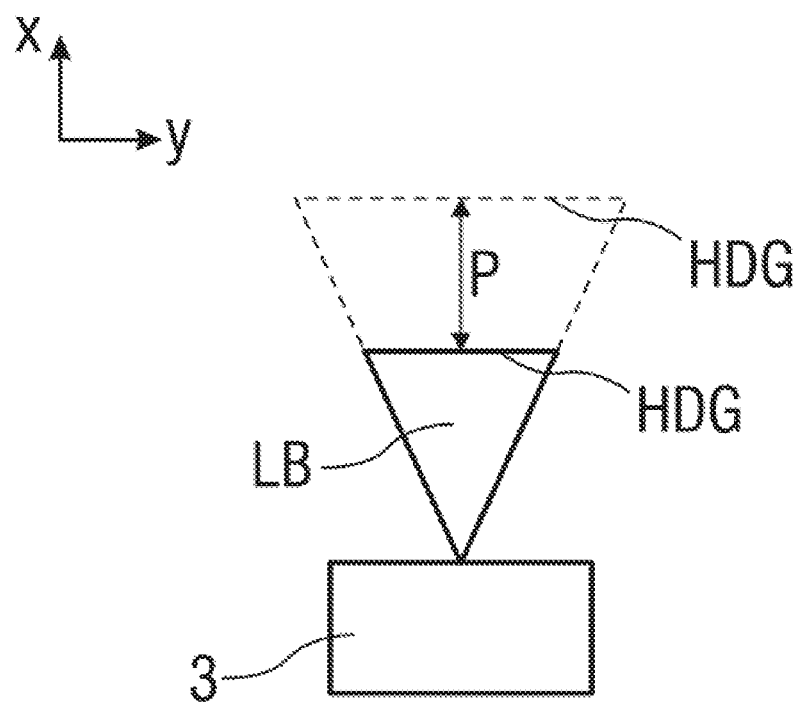
FIG. 3 is a schematic view of a headlamp having an adjustable cut-off line.

FIG. 3 is a schematic view of a headlamp 3 of this kind having an adjustable cut-off line HDG, the adjustable cut-off line HDG being indicated by dashed lines and an arrow P. The solid line represents the currently adjusted cut-off line HDG, and the dashed line represents the maximum possible adjustment of the cut-off line HDG. The cut-off line HDG can be displaced therebetween, as indicated by the arrow P.

FIG. 4 shows a method for operating the illumination device 2, in which method the cut-off line HDG is adjusted in a manner that is described in greater detail in the following.

The adjustment of the cut-off line HDG is achieved for example by means of an adjustment device 7 for mechanical adjustment of the headlamp 3 and/or of a lens and/or of a reflector and/or of at least one light source of the headlamp 3.

In a particularly advantageous embodiment, the headlamp 3 comprises a plurality of light sources 8 which can be actuated, in order to adjust the cut-off line HDG, and can thus each be activated or deactivated. In this case, the light sources 8 are advantageously in each case designed as a light-emitting diode (LED). The light sources 8 that are designed as light-emitting diodes are, in particular, arranged in a two-dimensional grid, also referred to as an LED field or LED array. In particular, the headlamp 3 is designed as what is known as a pixel headlamp, in particular as a high-resolution pixel headlamp, advantageously each pixel constituting a light source 8 and being actuable, and thus able to be activated or deactivated. Headlamps comprising high-resolution pixel light sources contain in particular pixelated light-emitting diodes, such as laser scanners, micromirror arrays (key word: DLP=Digital Light Processing) or backlit LCDs, as set out in the BMBF project μAPS. In this case, the adjustment of the cut-off line HDG is achieved, for example, in that in order to lower the cut-off line HDG the actuation of the light sources 8 that are to be activated, in particular the LEDs and/or pixels, is displaced downwards by one or more lines of the grid, and in order to raise the cut-off line HDG the actuation of the light sources 8 that are to be activated, in particular the LEDs and/or pixels, is displaced upwards by one or more lines of the grid. That is to say that in order to lower the cut-off line HDG one or more top lines of the grid of LEDs and/or pixels are deactivated, it being possible for one or more bottom lines to be activated, and in order to raise the cut-off line HDG one or more top lines of the grid of LEDs and/or pixels are activated, it being possible for one or more bottom lines to be deactivated. As a result, a projection LB that is generated and emitted by the headlamp 3 and that comprises the cut-off line HDG is accordingly displaced downwards or upwards.

Since headlamp technology in vehicles 1 is becoming increasingly powerful, the demands for preventing the dazzling of other road users are also increasing. An even briefly incorrectly adjusted cut-off line HDG, in particular in the case of a dimmed beam, can very intensely dazzle other road users. However, if, in order to reliably prevent this, the cut-off line HDG is adjusted so as to be too low, this significantly reduces a range of the headlamp 3 and thus the visibility, in particular in the case of a dimmed beam. Therefore, exact adjustment of the cut-off line HDG, and in particular maintenance of the specified position of the cut-off line HDG even during travel of the vehicle 1, is particularly advantageous.

It is already known from the prior art, in particular in the case of powerful xenon or LED headlamp systems, to adjust the cut-off line HDG by means of headlamp beam height control on the basis of a load state of the vehicle 1. For this purpose, it is known to arrange level sensors on chassis axles of the vehicle 1, in order to thereby determine the load state of the vehicle 1 and to adjust the cut-off line HDG accordingly, in particular by means of an adjustment device 7, for example by means of a servomotor. This allows for adjustment of the cut-off line HDG that is appropriate to a relevant load state, while the vehicle 1 is stationary.

However, a speed of such headlamp beam height control known from the prior art would not be sufficient for adjusting the cut-off line HDG in accordance with the relevant dynamic movements of the vehicle 1, for example due to ground unevenness, i.e., due to quick excitation of the vehicle 1 by the surface of the roadway FB, and thus to compensate the dynamic movements, during travel of the vehicle 1. A level of unresponsiveness of such headlamp beam height control known from the prior art is too great for this. Dynamic movements of this kind therefore mean that other road users may be briefly dazzled.

Therefore, in order to stabilize the cut-off line HDG against dynamic movements of the vehicle 1, in particular against pitching movements, even during travel, the illumination device 2 comprises a position and/or acceleration sensor 4 that is designed, in particular, as a gyro sensor. The position and/or acceleration sensor 4 is particularly advantageously designed as a combined position and acceleration sensor 4.

The position and/or acceleration sensor 4 is positioned close to the headlamp, particularly advantageously in the headlamp 3, in particular integrated in the headlamp 3, or arranged on the headlamp 3, expediently fastened directly to the headlamp 3. The position and/or acceleration sensor 4 can, in particular, record movements and/or accelerations in parallel with the vehicle height axis z, vehicle transverse axis y, and/or vehicle longitudinal axis x, and/or pivot movements, and/or pivoting accelerations, and/or rotational movements, and/or rotational accelerations, about one or more of the mentioned vehicle axes x, y, z, and/or a pitch angle θ, roll angle φ and/or yaw angle ψ. In particular, the position and/or acceleration sensor 4 records pitching movements of the vehicle 1, i.e., pivoting of the vehicle 1 about the vehicle transverse axis y thereof. In order to record such pitching movements of the vehicle 1, the position and/or acceleration sensor 4 records accelerations in parallel with vehicle height axis z, and/or pivoting and/or rotational accelerations about the vehicle transverse axis y, and/or pivot and/or rotational movements about the vehicle transverse axis y. Alternatively or in addition, the position and/or acceleration sensor 4 records a position of the vehicle 1, in particular with respect to the vehicle height axis z, the vehicle transverse axis y and/or the vehicle longitudinal axis x. The position determination is made possible, for example, by determining one or more accelerations during a pitching process of the vehicle 1.

The position and/or acceleration sensor 4, in particular, when designed as a gyro sensor, is, for example, designed as a micromechanical sensor that determines accelerations on a capacitive basis, or is, for example, designed as a piezoelectric or piezoresistive sensor.

Furthermore, the illumination device 2 comprises a control unit 5 that is coupled to the position and/or acceleration sensor 4 and that adjusts the cut-off line HDG. The control unit 5, which is designed, for example, as a controller, evaluates sensor information recorded by the position and/or acceleration sensor 4, and advantageously performs filtering, for example using a high-pass filter, and a plausibility check, and thereupon adjusts the cut-off line HDG accordingly, in order to compensate recorded pitching movements of the vehicle 1, i.e., in order compensate displacements of the cut-off line HDG due to the pitching movements. As a result, the dazzling of other road users, for example in the case of ground unevenness, is prevented or at least significantly reduced, and furthermore a maximum permissible range of the headlamp 3 is achieved in every driving situation.

Similar to the position and/or acceleration sensor 4, the control unit 5 is likewise positioned close to the headlamp, particularly advantageously arranged in the headlamp 3, in particular integrated in the headlamp 3, or arranged directly on the headlamp 3, expediently fastened directly to the headlamp 3. The control unit 5 and the position and/or acceleration sensor 4 are advantageously formed as a common structural unit 6. In particular, the position and/or acceleration sensor 4 is integrated in the control unit 5. This allows for simple handling of the common structural unit 6 during assembly of the illumination device 2, and, for example, also in the case of necessary repair.

The advantage of the illumination device 2 in comparison with the level control known from the prior art is that the position and/or acceleration sensor 4, which is designed in particular as a gyro sensor, is substantially more dynamic than the height sensors, i.e., level sensors, hitherto used in level control.

Advantageously arranging the position and/or acceleration sensor 4, as well as the control unit 5, close to the headlamp, in particular the arrangement thereof directly on the headlamp 3 or in the headlamp 3, results in particularly short signal paths and thus minimizes transmission times, such that no or at least only very short latencies arise. As a result, very quick reaction to the pitching movements of the vehicle 1, and resulting very quick adjustment of the cut-off line HDG, is made possible.

The adjustment of the cut-off line HDG by means of the control unit 5 is achieved, for example, by actuating the adjustment device 7 for mechanical adjustment of the headlamp 3 and/or of the lens and/or of the reflector and/or of at least one light source of the headlamp 3, i.e., for example by actuating a servomotor or a plurality of servomotor of the headlamp 3 or of the plurality of headlamps 3, or by actuating the plurality of light sources 8 of the headlamp 3, such that the cut-off line HDG is adjusted in the manner described above, by means of activating light sources 8 and deactivating further light sources 8 of the plurality of light sources 8.

Adjusting the cut-off line HDG by actuating the plurality of light sources 8, in order to activate or deactivate the relevant light source 8, in particular when the headlamp 3 is designed as a pixel headlamp, in particular as a high-resolution pixel headlamp, is particularly advantageous, since this can be achieved at very short latencies and it is possible to achieve a high degree of precision in the adjustment of the cut-off line HDG, since no mechanical movements are required. In this case, as already described above, the cut-off line HDG can be adjusted, for example, in that a projection LB, comprising the cut-off line HDG, is displaced upwards or downwards by a few light sources 8, in particular pixels, in that the corresponding light sources 8 are activated or deactivated. This allows for virtually instantaneous correction of the position of the cut-off line HDG.

If the position and/or acceleration sensor 4, for example, records a deceleration of the vehicle 1, resulting in a pitching movement of the vehicle 1, i.e., lowering of the front end of the vehicle 1, the actuation of the light sources 8 that are to be activated, in particular the LEDs and/or pixels, is displaced upwards by one or more lines of the grid, such that the cut-off line HDG is displaced upwards. If the position and/or acceleration sensor 4, for example, records an acceleration of the vehicle 1, resulting in an opposing pitching movement of the vehicle 1, i.e., raising of the front end of the vehicle 1, the actuation of the light sources 8 that are to be activated, in particular the LEDs and/or pixels, is displaced downwards by one or more lines of the grid, such that the cut-off line HDG is displaced downwards. An analogous approach is taken, for example, in the case of ground unevenness and resulting pitching movements, i.e., if the front end is raised and/or a tail region of the vehicle 1 is lowered, the cut-off line HDG is displaced downwards, i.e., lowered, in the manner described above, and if the front end is lowered and/or the tail region of the vehicle 1 is raised, the cut-off line HDG is displaced upwards, i.e. raised, in the manner described above.

The adjustment of the cut-off line is performed in an analogous manner in the case of headlamps comprising high-resolution pixel light sources, such as pixelated light-emitting diodes (key word: µAPS), laser scanners, micromirror arrays (key word: DLP) and backlit LCDs.

In an advantageous embodiment, the control unit 5 additionally evaluates information from at least one surroundings recording means of the vehicle 1, which records the surroundings in front of the vehicle 1, and/or information from an active chassis system of the vehicle 1, and determines and/or predicts pitching movements of the vehicle 1 therefrom. That is to say that, in particular, information from one or more forward-looking systems of the vehicle 1 is used. As a result, in particular, pitching movements of the vehicle 1 can already be predicted before they occur. The surroundings recording means may, for example, comprise at least one stereo camera device, at least one lidar device, at least one radar device and/or at least one ultrasound device. In particular, the active chassis system of the vehicle 1 may also be coupled to the surroundings recording means or comprise the means. For example, the position and/or acceleration sensor 4, and/or the control unit 5, may also be a component of the active chassis system, in particular may be integrated therein. Therefore, the position and/or acceleration sensor 4, and/or the control unit 5, can be used both for adjusting the cut-off line HDG of the headlamp 3 and for the active chassis system, as a result of which additional components are saved on.

The information of the at least one surroundings recording means of the vehicle 1, which records the surroundings in front of the vehicle 1, and/or the information of the active chassis system of the vehicle 1, can, in particular, be used in a predictive manner, in order to eliminate latencies from the adjustment of the cut-off line HDG and to thus move the stabilization of the cut-off line HDG temporally even closer to the quick reaction speed of the position and/or acceleration sensor 4 that is designed in particular as a gyro sensor. That is to say that, in particular, the adjustment of the cut-off line HDG or at least the actuation of the adjustment can, for example, already begin before a relevant pitching movement is recorded by the position and/or acceleration sensor 4, since the pitching movement has already been predicted based on the information of the at least one surroundings recording means of the vehicle 1, which records the surroundings in front of the vehicle 1, and/or based on the information of the active chassis system of the vehicle 1. For example, the already initiated adjustment of the cut-off line HDG is then defined more precisely on the basis of the pitching movement recorded by the position and/or acceleration sensor 4.

The adjustment of the cut-off line HDG by means of the control unit 5 is advantageously performed only by means of open-loop control, and not by means of feedback control. For this purpose, for example, a relevant position and/or acceleration of the vehicle 1 is recorded by means of the position and/or acceleration sensor 4 and is passed to the control unit 5. The control unit 5 then determines, based on the transmitted sensor information and/or based on the information of the at least one surroundings recording means of the vehicle 1, which records the surroundings in front of the vehicle 1, and/or the information of the active chassis system of the vehicle 1, one or more corresponding parameters KP, in particular correction parameters, and/or items of calibration data KD, for example from a table or characteristic curve, for example from what is known as a lookup table, and actuates the adjustment device 7 or the light sources 8 accordingly. The table or characteristic curve contains specified parameters KP, in particular correction parameters, and/or items of calibration data KD, which the control unit 5 selects according to the position and/or acceleration determined in each case by the position and/or acceleration sensor 4, and actuates the adjustment device 7 or the plurality of light sources 8 accordingly. This allows for an adjustment of the cut-off line HDG that can be implemented in a particularly quick, efficient, flexible and simple manner, and which requires, in particular, only minimal computational effort. Complex feedback control, involving a correspondingly high level of computational effort and time investment, which would lead to a delay in the adjustment of the cut-off line HDG, is thus avoided. The parameters KP, in particular correction parameters, and/or calibration data KD are, in particular, stored directly in the control unit 5, such that access times for accessing a further unit are omitted.

As already described, the position and/or acceleration sensor 4 is advantageously designed as a combined position and acceleration sensor 4, by means of which both the position and accelerations of the vehicle 1 can be recorded. In particular, changes in the adjustment of the cut-off line HDG due to an adjustment of the headlamp 3, for example over a longer usage time of the vehicle 1, and/or due to external influences, can be determined by means of a combined position and acceleration sensor 4 of this kind. In the case of illumination devices 2 according to the prior art, it is necessary to correct the adjustment during time in a workshop. Arranging the combined position and acceleration sensor 4 in the headlamp 3 or directly on the headlamp 3 makes it possible to determine and compensate, using the position and acceleration sensor 4, position tolerances that arise, with respect to a specified setting, in particular with respect to an ex-factory delivery state, in which factory the vehicle 1 was manufactured, in particular by means of headlamp beam height control and/or modifying the projection LB of the headlamp 3, expediently by means of the control unit 5 and corresponding actuation. In order to achieve this, the combined position and acceleration sensor 4, in particular the position sensor component thereof, exhibits a very high degree of accuracy of for example much less than 0.1° (<<0.1°).

Advantageously, the illumination device 2 makes it possible to omit the above-described level sensors, on the chassis axles of the vehicle 1, that are known from the prior art.

FIG. 4 schematically shows a course of a possible embodiment of a method for operating the illumination device 2. The position and/or acceleration sensor 4 records, for example, a pitch angle $\theta$, roll angle $\varphi$ and yaw angle $\psi$, as well as a x-axis movement dx, a y-axis movement dy and a z-axis movement of the vehicle 1, the relevant axis movement dx, dy, dz being intended to be understood as a movement of the vehicle 1 in parallel with the relevant vehicle axis x, y, z. The sensor data that is recorded by the position and/or acceleration sensor 4, i.e., the sensor information of the position and/or acceleration sensor 4, are passed to the control unit 5 and evaluated there in the manner described above. Based on parameters KP, in particular correction parameters, and calibration data KD, which are advantageously stored in the control unit 5, the control unit 5 determines a correction angle $\alpha$ of the cut-off line HDG and actuates the adjustment device 7 accordingly, for mechanical adjustment of the headlamp 3 and/or of the lens and/or of the reflector and/or of the at least one light source of the headlamp 3, in order to thereby correct the cut-off line HDG, and/or actuates the plurality of light sources 8 in order to correct the cut-off line HDG, by activating or deactivating the relevant light source 8, and the resultant displacement of the projection LB, in particular of the high-resolution pixel headlamp.

The correction angle $\alpha$ relates to an angle $\beta$ between a horizontal H and an upper boundary of the projection LB, i.e., the upper edge of the cut-off line HDG. In this case, the correction angle $\alpha$ is a component of the angle $\beta$. The angle $\beta$ corresponds to the sum of the correction angle $\alpha$ and a lowering of the projection LB, in particular of the upper boundary of the projection LB, and thus of the upper edge of the cut-off line HDG, by one percent, relative to the horizontal H.

Considered more closely, $\beta=\alpha+1\%+Y$, and Y is the correction value that is calculated by the level sensors for the headlamp beam height control. The 1% additional lowering is available in order to be able to be certain of adhering to legal requirements.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An illumination device for a vehicle, the illumination device comprising:
   a headlamp;
   a position and/or acceleration sensor configured to record pitching movements of the vehicle;
   a control unit configured to change a cut-off line of the headlamp to compensate for the pitching movements recorded by the position and/or acceleration sensor, wherein the control unit stores a table or characteristic curve containing correction parameters and/or items of calibration data, which are selected by the control unit according to the pitching movements recorded by the position and/or acceleration sensor; and
   an adjustment device, coupled to the control unit, configured to mechanically adjust the headlamp, at least one light source of the headlamp, a lens of the at least one light source, and/or a reflector of the at least one light source based on the selected correction parameters and/or items of calibration data stored in the control unit,
   wherein the position and/or acceleration sensor is integrated in the control unit and the control unit is arranged in the headlamp or directly on the headlamp, and
   wherein the position and/or acceleration sensor has a degree of accuracy less than 0.1°.

2. The illumination device of claim 1, wherein the position and/or acceleration sensor is a gyro sensor.

3. The illumination device of claim 1, wherein the control unit is coupled to
   at least one surroundings recording means of the vehicle that records surroundings in front of the vehicle, and/or
   an active chassis system of the vehicle.

4. The illumination device of claim 1, wherein the headlamp has a plurality of pixelated LED light sources arranged in a two-dimensional grid, as an LED chip comprising light-emitting diodes, as a laser scanner comprising a micro mirror array, or as a backlit LCD.

5. A method for operating an illumination device of a vehicle, the illumination device comprising a headlamp, a position and/or acceleration sensor, and a control unit, the method comprising:
   recording pitching movements of the vehicle using the position and/or acceleration sensor; and
   changing, by the control unit, a cut-off line of the headlamp to compensate for the pitching movements recorded by the position and/or acceleration sensor using an adjustment device coupled to the control unit, wherein the change of the cut-off line involves
      the control unit selecting correction parameters and/or items of calibration data, which are stored in a table or characteristic curve in the control unit, according to the recorded pitching movement of the vehicle, and
      the adjustment device mechanically adjusting the headlamp, at least one light source of the headlamp, a lens of the at least one light source, and/or a reflector of the at least one light source based on the selected correction parameters and/or items of calibration data stored in the control unit,
   wherein the position and/or acceleration sensor is integrated in the control unit and the control unit is arranged in the headlamp or directly on the headlamp, and
   wherein the position and/or acceleration sensor has a degree of accuracy less than 0.1°.

6. The method of claim 5, further comprising:
   evaluating, by the control unit, information from at least one surroundings recording means of the vehicle, which records the surroundings in front of the vehicle, and/or information from an active chassis system of the vehicle; and
   determining and/or predicting, by the control unit, the pitching movements of the vehicle using information from the at least one surroundings recording means of the vehicle and/or using information from an active chassis system of the vehicle.

* * * * *